United States Patent

[11] 3,624,017

| [72] | Inventor | Martin E. Sorkin |
| | | Greensboro, N.C. |
| [21] | Appl. No. | 879,547 |
| [22] | Filed | Nov. 24, 1969 |
| [45] | Patented | Nov. 30, 1971 |
| [73] | Assignee | Dow Corning Corporation |
| | | Midland, Mich. |

[54] FAST CURING SILOXANE RELEASE EMULSIONS
8 Claims, No Drawings

[52] U.S. Cl. .................................................. 260/29.2 M, 117/155 R, 161/209, 161/406, 260/46.5 G, 260/825
[51] Int. Cl. ....................................................... B32b 7/06, C08g 47/04, D21h 1/28, D21h 1/34
[50] Field of Search ............................................ 260/29.2 M, 825, 46.5 G

[56] References Cited
UNITED STATES PATENTS

| 2,891,920 | 6/1959 | Hyde et al. | 260/29.2 M |
| 2,985,544 | 5/1961 | de Monterey et al. | 260/29.2 M |
| 3,061,567 | 10/1962 | Keil | 260/29.2 M |
| 3,294,725 | 12/1966 | Findlay et al. | 260/37 |
| 3,308,203 | 3/1967 | Metevia et al. | 260/825 |
| 3,360,491 | 12/1967 | Axon | 260/37 |
| 3,389,102 | 6/1968 | Schurrbusch et al. | 260/29.2 M |

*Primary Examiner*—Julius Frome
*Assistant Examiner*—Arthur H. Koechkert
*Attorneys*—Robert F. Fleming, Jr., Laurence R. Hobey, Harry D. Dingman and Howard W. Hermann ABSTRACT: Emulsion copolymers of from 80 to 98 mol. percent dimethylsiloxane and from 2 to 20 mol. percent $RSiO_{3/2}$ will cure on substrates under the influence of SiOH condensation catalysts in 30 seconds or less at 200° F. to give release values of less than 50 g. per inch. For example, an emulsion of a copolymer made by emulsion copolymerizing cyclic dimethylsiloxanes and methyltrimethoxysilane in amount to give 96 mol. percent dimethylsiloxanes and 4 mol. percent monomethylsiloxane will cure on paper in 20 seconds at 200° F. to give a release to J and J adhesive tape of 26 g. per inch.

FAST CURING SILOXANE RELEASE EMULSIONS

It is the object of this invention to provide a one package silicone emulsion which is catalyzed and which is stable in the catalyzed state for upwards of 6 months or more at temperatures of 120° F. or below and which, when applied to a substrate will cure in 30 seconds or less at 200° F. to give a release value of 50 g. or less per inch on parchment paper in accordance with the test described below.

The use of dimethylsiloxanes as release agents on substrates such as paper for adhesive materials such as rubber, pressure-sensitive adhesives, asphalt, foodstuffs, and the like, is well known. At the present time two general types are employed, namely, a solvent system and aqueous emulsion. These systems are described, for example, in U.S. Pat. No. 3,061,567 and are based, for the most part, on methylhydrogensiloxane as the curing agent. In spite of the well known commercial success of these types of release agents they have several limitations which prevent their use in certain important areas in which silicone release agents could profitably be used.

First, the materials based on SiH curing mechanism have an inherent instability because of the reactivity of the SiH under aqueous conditions, particularly in he presence of acids or basic materials.

Secondly, the rate of cure of the emulsion release agents now used in the art is too slow for many applications. For example, cure is obtained after 2 minutes at 235° F. or in shorter period of time at 300° to 350° F. However, these cure rates and temperatures are detrimental to many types of paper and also show down the rate of coating the paper, thereby making the coating operation too expensive for many applications. Finally, at the lower temperatures there is excessive transfer of the silicone to the adhesive surface. For those applications involving pressure-sensitive adhesives such transfer cannot be tolerated.

Finally, one of the most important uses for silicone release agents is on backing material for pressure-sensitive adhesive labels or for other pressure-sensitive devices, such as wallpaper, decals, and the like. To date, however, solvent based silicone release agents are primarily employed in such applications because of the unsatisfactory nature of the presently available silicone release emulsions. However, in order to use solvent-based systems one must also use expensive substrates such as super-calendered Kraft (i.e. 40 lbs.), M and O Kraft, or clay-coated Kraft. It is not possible to use solvent-based systems on the cheaper paper substrates such as southern kraft unless one precoats the paper with a plastic such as carboxymethyl cellulose or polyethylene. This is true because unless the porous substrate is coated, with an organic plastic, the silicone release agent will soak into the substrate and so much would have to be applied to give effective release that the coats would be prohibitive.

Silicone emulsions, however, can be employed to coat these poor substrates, particularly when extenders such as starch or carboxymethyl cellulose are employed to keep the silicone on the surface of the substrate. However, previously known silicone release emulsions with or without SiH compounds were too slow curing to be employed on efficient coating devices such as paper-machines. Furthermore, the temperature required to cure these emulsions was too high and this is detrimental to the strength of the paper. The reason for this is that when temperatures of 300+ F. or above are employed, or when prolonged heating at 250° F. is used, the paper dehydrates and loses dimensional stability and a portion of its strength.

The change in dimensions of the paper is quite detrimental, particularly when the release material is to be employed in connection with pressure-sensitive labels. The most effective commercial way of preparing such labels is to apply a pressure-sensitive label stock to a backing material with the release agent between the adhesive and backing material and then stamping with a die which cuts through the label but not through the backing. If the die cuts through the backing, then the entire sheet has been ruined since it is difficult and impossible to remove labels from the backing material. If the dimension of the paper changes during the curing of the release agent, the die will cut through the backing as well through the label and thereby ruin the assembly. Also in the release of very sticky materials, such as asphalt, raw rubber and bulk pressure-sensitive adhesives, one does not want the paper to tear when you are removing these materials from the containers. consequently, it is very detrimental to many applications when the temperature of cure of the release agent causes loss of strength in the paper.

By using the release agents of this invention one can cure at times and temperatures which do not cause the dehydration of the paper and which retain the maximum paper strength and the maximum dimensional stability in the paper.

Finally, the use of emulsions is obviously advantageous because it dispenses with the solvent disposal problem, which is becoming increasingly acute because of contamination of the environment which is now a plague to the United States and other industrial nations.

As mentioned above, the emulsions of this invention can be coated directly from a paper machine This is true because they have the combination of mechanical stability and fast-cure, which enables one to operate at the speed which a paper machine is run. This gives a substantial reduction in cost in the paper-coating operations.

In addition, the emulsions of this invention have exceedingly long shelf life. That is the materials are chemically stable and the emulsions do not deteriorate upon aging at room temperature, or even at 120° F. The latter is the maximum temperature which one normally expects to encounter during storage of any commercial item. This means that the user does not have to contend with the addition of catalyst during the coating operation and furthermore, he does not have to worry about limited pot life in the coating tank or in the coating apparatus, thereby spoiling the operation. Furthermore, the great mechanical stability of the emulsions of this invention enables these emulsions to be pumped and otherwise agitated in the various ways in which agitation is encountered during commercial coating operations.

The preparation of emulsion polymers, including copolymers of dimethylsiloxane and monomethylsiloxane, is disclosed in U.S. Pat. No. 3,294,725, particularly example 17 of said patent. However, none of the emulsion formulations described in said patent give the required fast cure that is essential for operativeness of the emulsions of this invention. Dimethylsiloxane-monoethylsiloxane emulsions prepared by emulsion polymerization are also disclosed in U.S. Pat. No. 3,360,491, particularly example 6, No. 14, which shows emulsion polymerization of $(CH_3O)_2Si(CH_3)O[Si(CH_3)_2O]_{12}Si(CH_3)(OCH_3)_2$. Emulsions obtained by emulsion polymerization this compound do not have the requisite stability for commercial operation as one package systems.

This invention relates to a composition capable of curing on a substrate in 30 seconds or less at temperatures of 200° F. or below to give release values of 50 g. per inch or below the when tested on parchment paper by the standard test RC 283 TAPPI, consisting essentially of an aqueous emulsion of a copolymer of 80 to 98 mol. percent of dimethylsiloxane and from 2 to 20 mol. percent $RSiO_{3/2}$ in which R is methyl or vinyl, said emulsion having been prepared by emulsion polymerization of a mixture of dimethylsiloxane and $RSiX_3$ in which X is a hydrolyzable group producing a water-soluble byproduct and said emulsion being stable on storage for at least week when catalyzed with an SiOH condensation catalyst effective for curing the copolymer under the above specified conditions.

It should be understood that the compositions of this invention can be coated on any substrate. The tests of the operativeness of the material, however, is whether or not it will give the release values of 50 g. or less when coated on parchment and cured under the above specified conditions. Parchment is employed as a test to separate operative from inoperative materials because it has a reproducible surface. It should be understood that the absolute release values of any given release agent vary somewhat depending upon the nature of the substrate. For example, a release agent which gives a value of say 20 g. on parchment may well give a release value of say 60 g. on a more porous substrate. However, another release agent which gives a value of 50 g. or more on parchment would give a value of say 100 g. or more on the same porous substrate. Thus, the use of parchment gives a reliable, relative rating for the efficiency of release agents.

It has been found that for a release agent to operate efficiently, for release of present day pressure-sensitive adhesives and for very sticky materials such as raw rubber and asphalt, a release of 50 g. or less (preferably less) on parchment paper is required. If the release on parchment is greater than 50 g. per inch the agent will not give satisfactory release of such adhesives on any substrate. The standard test in industry for determining the effectiveness of a release agent is RC 283 TAPPI in which the release agent is applied to a substrate and cured. Johnson and Johnson Surgical Adhesive Tape is then applied to the surface and stripped therefrom on a Keil tester. The release value is recorded in grams of pull per inch of width of the tape.

A second parameter is needed for testing the adequacy of cure of the release agent. One must obtain adequate subsequent adhesion of an adhesive which has been applied to the release coating and removed therefrom. If the silicone is improperly cured it will transfer to the surface of the adhesive and subsequent adhesion of that material would be much less than normal. This is known as the subsequent adhesion test and is run by applying the Johnson and Johnson Adhesive Tape which has been stripped from the release coating surface to a stainless steel panel, and then measuring on a Keil tester the force required to remove the tape from the steel surface. The emulsions of this invention meet both of these tests.

The term "consisting essentially of" as employed herein, means that the compositions of this invention can contain other ingredients which do not materially affect the desirable properties. These include, for example, extenders normally employed with silicone release agents such as starch, carboxymethyl cellulose or organic resins. The function of the extender is to keep the maximum amount of silicone release agent on the surface of the substrate during coating. Other ingredients normally used with silicone release agents include adhesion promoters, additional wetting agents, antifreeze compounds and corrosion inhibitors.

The copolymers of this invention must be prepared by copolymerizing a mixture of the dimethylsiloxane and the hydrolyzable silanes shown above It has been found that to first couple the dimethylsiloxane to the hydrolyzable silane to produce polymers having polyfunctional ends and then emulsion polymerizing such a material does not give stable emulsions. The term "mixture of" includes both a process in which the two ingredients are first mixed and then added to the emulsion and polymerized and a process in which the ingredients are added separately to the system. If desired, the dimethylsiloxane can be added first and polymerized and the silane then added and copolymerized with the dimethylsiloxane polymer.

Aside from the above limitations, the emulsions of this invention can be prepared by any of the procedures shown in U.S. Pat. No. 2,891,920, 3,294,725 and 3,360,491. The procedure shown in U.S. Pat. No. 3,294,725 is preferred. This means that the surfactant used in the emulsion polymerization can be either anionic, cationic or nonionic and the catalyst can be either a strong acid or a strong base. The starting dimethylsiloxane can be either a cyclic or linear material and the molecular weight of the starting dimethylsiloxane is not critical. As is well known the cyclic dimethylsiloxanes open up during the emulsion polymerization conditions to produce hydroxyl endblocked siloxanes. In effect, therefore, the polymerization is actually between hydroxyl endblocked dimethylsiloxane and the silanes added thereto. The product is an emulsion copolymer of dimethylsiloxane and $RSiO_{3/2}$ which copolymer contains silicon-bonded hydroxyl groups. The reason for the combination of rapid cure and great emulsion stability of the compositions of this invention is not understood.

In all cases the mol. percent $RSiO_{3/2}$ must be in the range from 2 to 20 mol. percent. When the amount of monoorganosiloxane is outside this range unsatisfactory release values are obtained under the required conditions of cure. The preferred range is 3 to 15 mol. percent.

For the purpose of this invention R can be methyl or vinyl, and X can be any hydrolyzable group which gives a water-soluble byproduct. As is well known, hydrolyzable groups on silicon react with water at room temperature to give HX compounds and the HX compound should be water-soluble. It goes without saying that when HX is acid, one would want to employ an acid polymerization catalyst for the emulsion polymerization and a surfactant which is either anionic or nonionic. By the same token when HX is basic one wants to employ a basic catalyst for the emulsion polymerization and a surfactant which is either cationic or nonionic. When HX is neutral the type of surfactant is immaterial and the emulsion polymerization catalyst can be either acid or basic.

When the emulsion polymerization has been csrried out in accordance with the methods of any of the above patents, which are hereby incorporated by reference in their entirety, the emulsion is then brought to a pH of about 7(i.e. in the range of 6 to 8). This stops polymerization of the siloxane and stabilizes the copolymer. The emulsion can then be stored as such, or it can be catalyzed with any SiOH condensation catalyst as specified below, and stored for long periods of time without affecting the properties of the emulsion with respect to rate of cure and release values.

Time of emulsion polymerization is not critical so long as the polymer will give the desired cure. In general, polymerization times of from 2 to 24 hours are sufficient.

Since the emulsion polymerization catalyst* (*It should be understood that the surfactant can serve as the emulsion polymerization catalyst.) needs to be neutralized at the end of the emulsion polymerization process, it is obvious that when X produces an acid or basic material this byproduct is neutralized along with the polymerization catalyst. Thus, care should be taken that the amount of salt built up in the emulsion should not be sufficient to break it. This means then, that it is preferable to use alkoxysilanes or ketoxime silanes which form neutral byproducts when the mol percent of $RSiX_3$ is high.

For the purpose of this invention X can be any hydrolyzable group which gives a water-soluble byproduct such as halogen, $-NR'_2$–$ON=CR'_2$,

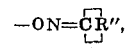

$R'C(=O)O-$, $R'O(R''O)_n-$ and $-ONR'_2$ in which $R'$ is a monovalent hydrocarbon or halohydrocarbon radical and $R''$ is a divalent hydrocarbon or halohydrocarbon radical. Specific examples of X groups which are operative herein are halogen such as chlorine, bromine or fluorine; amino such as dimethylamino, ethylmethylamino or diethylamino; ketoxime such as $-ON=C(CH_3)(C_2H_5)$ or $-ON=C(CH_3)_2$; acyl groups such as acetoxy, propionyloxy or formoyloxy; alkoxy groups such as methoxy, ethoxy or isopropoxy; alkoxyalkoxy groups such as beta-methoxyethoxy, beta-ethoxyethoxy, $-O-(CH_2CH_2O)_2CH_3$ or $O(CH_2CH_2O)_3C_2H_5$; and amino-oxy radicals of the formulas $-ON(CH_3)_2$ and $-ON(C_2H_5)_2$.

Any SiOH condensation catalyst can be employed to cure the compositions of this invention. These catalysts are well known in the art and include, for example, amines such as hexylamine, diethylamine, cyclohexylamine; amine salts such as hexylaminehexoate, tetra-methyl guanidine dioctoate, pyridine hydrochloride, and diethylamine phosphate; quaternary ammonium salts such as tetra-methyl ammonium acetate, benzyltrimethyl ammonium formate; quaternary ammonium alkoxides such as beta-hydroxyethyl trimethyl ammonium ethoxide, and benzyltrimethyl ammonium methoxide; carboxylic acid salts of metals such as dibutyl tin diacetate, dibutyl tin dilaurate, stannous octoate, iron octoate, lead hexoate, zinc octoate, cobalt acetate and dibutyl tin diacetate; titanates such as triethyanolamine titanate, and acetylacetonyl titanate or the corresponding zirconates and mercapto salts of tin compounds of the formula $Y_2Sn(SCH_2COOY')_2$ in which YAND Y' are alkyl groups from one to 18 carbon atoms such as methyl, ethyl or octadecyl.

The amount of catalyst is not critical so long as the amount is sufficient to cure the siloxane under the above specified conditions. Also, obviously the amount of catalyst should not be sufficiently great to deleteriously affect the stability of the emulsion. The amount of catalyst varies depending upon the type used so no meaningful numerical limitations can be given. The catalyst can be employed in the form of aqueous solutions or dispersions or added to the emulsion in the form of an emulsion of the catalyst itself.

The emulsions of this invention can be applied and cured on any substrate such as wood, metal, organic plastics, textile fabrics, both natural and synthetic, glass and paper.

The application can be made in any convenient manner such as by dipping, roll-coating, spraying, knife-coating or coating with an air-knife. In coating operations where a great deal of agitation of the emulsion is forth-coming such as during coating with an air-knife, it is desirable to have the surfactant from the emulsion polymerization in as low as a concentration as is possible to prevent excessive foaming.

It should be understood, of course, that the compositions of this invention can be cured at temperatures above and below 200° F. The higher the temperature the shorter the time required. Actually many of the formulations will cure below 100° F. Curing temperatures in the ovens can be as high as 500° F. provided the put through is fast enough that the paper does not have time to reach an excessive temperature.

The following examples are illustrative only and should not be construed as limiting the invention which is properly delineated in the appended claims.

EXAMPLE 1

This example shows the criticality of the mol. percent of monoorganosiloxane.

In each case shown below cyclic dimethylsiloxanes comprising a mixture primarily of cyclic tetramer and cyclic pentamer were emulsified by using 1 percent by weight dodecyl benzene sulfonic acid based on the total weight of the emulsion. The cyclics were added to the surfactant water mixture then homogenized and 1 percent more acid in a small amount of water was then added.

The emulsions were heated to 85° C. for 1 to 3 hours then methyltrimethoxysilane was added in the amount to give the mol percent monomethylsiloxane shown in the table below. Each emulsion was then heated at 47.5° C. for 15 to 18 hours. The emulsion was neutralized with the addition of 10 percent sodium hydroxide solution. The concentration of the siloxane in the emulsion was 40 percent. Each emulsion wad diluted with water to 8 percent solids and catalyzed with the addition of a 20 percent by weight emulsion of dibutyl tin dilaurate in amount to give one part dibutyl tin dilaurate for 10 parts by weight silicone.

Each emulsion was applied at 8 to 10 percent by weight solids to parchment paper and each was cured 30 seconds at 200° F. the release values were determined using the standard test indicated above on a Keil tester and the subsequent adhesion was determined by applying the Johnson and Johnson tape to stainless steel panels and measuring the force required to remove it.

| Mol. % mono-methylsiloxane | Release in grams per inch | Subsequent adhesion in grams per inch |
| --- | --- | --- |
| 0.9 | 61 | 141 |
| 3.75 | 28 | 197 |
| 5.10 | 39 | 143 |
| 6.90 | 26 | 147 |
| 8.15 | 21 | 210 |
| 12.60 | 19 | 191 |
| 18.8 | 46 | 233 |

It is noted that at 18.8 mol. percent monomethylsiloxanes the release value has started to rise again.

EXAMPLE 2

This example shows the stability of the instant emulsions as reflected by good release values after storage under the conditions shown below.

300 pounds of 40 percent by weight silicone emulsion was prepared by the method of example 1, except that the second step was carried out 6 hours at 85° C. and 4 mol. percent monomethylsiloxane was incorporated into the copolymer.

The emulsion was catalyzed with dibutyl tin dilaurate in amount of 1 part by weight tin salt per 10 parts silicone. The emulsion was checked immediately after catalyzation for release in the standard manner and then aged at room temperature for the times shown below and again checked. Each test was run on parchment at a coating concentration of 10 percent solids at each cure was 20 seconds at 200° F.

| Aging Time | Release in grams per inch | Subsequent adhesion in grams per inch |
| --- | --- | --- |
| 0 | 30 | 145 |
| 1 week | 22 | 278 |
| 1 month | 25 | 226 |
| 3 months | 13 | 170 |
| 4 months | 18 | 161 |
| 5 months | 10 | 155 |

EXAMPLE 3

The following experiment was carried out on paper coating machinery in a paper-coating plant. The emulsion employed was made in accordance with procedure of example 2 and the coating was carried out at 11 percent silicone solids on parchment to give 0.5 pounds of cured silicone film for 3000 square feet of paper. The coated paper was passed through an oven heated at 500 ° F. at such a rate that the residence time in the oven was 0.6 seconds. While the paper was being passed through, air was forced over the paper at a rate of from 1000 to 10,000 feet per minute. Under these curing conditions the temperature actually attained by the paper is just enough to dry the water from the coating. The release values obtained were 13 g. per inch and the subsequent adhesion was 204 g. per inch.

EXAMPLE 4

An emulsion was prepared in accordance with procedure of example 2 and the emulsion was catalyzed using tetramethyl quanidine octoate, and tetra-methyl quanidine oleate as the catalyst each in amount of 0.5 part catalyst per 10 parts silicone solids. The emulsions were each coated on parchment and cured 30 seconds at 200° F. the resulting values were as follows:

The octoate 35 g. per inch release and 240 g. per inch subsequent adhesion. Oleate 30 g. per inch release and 230 g. per inch subsequent adhesion.

EXAMPLE 5

The following catalysts were used in lieu of that of example 1: iron octoate, dibutyl tin diacetate and dioctyl tin S,S-(dioctylmercaptoacetate). In each case the emulsion was coated on parchment and cured as in example 1, and in each case equivalent release values and subsequent adhesions were obtained.

EXAMPLE 6

This example shows that the other of addition of the ingredients of the copolymer is not critical.

A mixture of 400 g. of cyclic dimethylsiloxane and 30 g. of methyltrimethoxysilane was added to a mixture of 526 g. of water containing 20 g. of dodecylbenzene sulfonic acid. The mixture was then passed twice through a homogenizer at 4500 p.s.i. The resulting emulsion was heated 6 hours at 70° C. and then one-half of the emulsion was neutralized with sodium hydroxide and the remaining half was heated a total of 24 hours at 70° C. In each emulsion the mol percent of monomethylsiloxane was 3.9 percent. Each emulsion was then coated on parchment paper and cured 20 seconds at 200° F. The release and subsequent adhesion was determined and the results are shown below.

| Polymerization time | Release in grams per inch | Subsequent adhesion in grams per inch |
|---|---|---|
| 6 hours | 28 | 240 |
| 24 hours | 31 | 232 |

EXAMPLE 7

This example shows the inoperativeness of the emulsions of example 17 of U.S. Pat. No. 3,294,725 when cured under the conditions of this invention.

The ingredients of example 17 of U.S. Pat. No. 3,294,725 were emulsion polymerized in he same proportions shown in said example at 70° C. for 18 hours, 24 hours an 4 days respectively. In this example the mol. percent of monomethylsiloxane was 0.4 percent. Each emulsion was neutralized with sodium hydroxide and catalyzed with dibutyl tin dilaurate in amount to give 1 part dibutyl tin dilaurate per 10 parts silicone. Each emulsion was then coated on parchment paper and cured at 200° F. for 20 seconds. The release values and subsequent adhesions by the standard test are given in the table below.

| Polymerization time | Release in grams per inch | Subsequent adhesion in grams per inch |
|---|---|---|
| 18 | 108 | 97 |
| 24 | 163 | 106 |
| 4 days | 137 | 104 |

It can be seen that none of these values are acceptable either with respect to release or subsequent adhesion. In general, a subsequent adhesion of 130 g. or less is not acceptable because it indicates excessive transfer of the siloxane to the adhesive surface.

EXAMPLE 8

This example shows the inoperativeness of the emulsion of example 20 of U.S. Pat. No. 3,294,725 for the purpose of this invention.

The procedure of example 20 of said patent was repeated employing the ingredients shown therein and the conditions of polymerization. The resulting copolymer contained 1.1 mol. percent monophenylsiloxane. The emulsion was neutralized and catalyzed with dibutyl tin dilaurate in amount of 1 part salt per 10 parts siloxane copolymers. The resulting emulsion was applied to parchment paper and cured 20 seconds at 200° F. The release values and subsequent adhesion were determined in accordance with the standard test and found to be as follows:

Release-89 g. per inch, and

Subsequent adhesion-144 g. per inch.

EXAMPLE 9

This example is for the purpose of showing the instability of emulsions obtained by merely adding methyltrimethoxysilane to a preferred dimethylsiloxane emulsion and allowing the catalyzed emulsion to stand.

An emulsion was prepared by polymerizing cyclic dimethylsiloxanes by the method shown in example 1 to give 35 percent by weight emulsion of hydroxyl endblocked dimethylpolysiloxane of 100,000 cs. viscosity. The emulsion was then neutralized with NaOH The emulsion was diluted to 5 percent solids with water and methyltrimethoxysilane was added in amount to give 5.7 mol. percent monomethylsiloxane in the mixture. The emulsion was then catalyzed with dibutyl tin dilaurate in amount to give 1 part salt per 18 parts by weight total silicone solids. The emulsion was allowed to stand for the times indicated below and after each of these times it was coated on parchment and cured 1 minute at 325° F. The release values in subsequent adhesion is shown in the table below.

| Time after catalyzation | Release in grams per inch | Subsequent adhesion in grams per inch |
|---|---|---|
| 0 | 24 | 328 |
| 2 hours | 36 | 236 |
| 4 hours | 63 | 181 |
| 6 hours | 72 | 198 |

EXAMPLE 10

Equivalent results are obtained when the following surfactant-catalysts are used to prepared the emulsion copolymers of example 1:
octylbenzene sulfonic acid
butyl naphthalene sulfonic acid
omega-trimethylsilyl decyl sulfonic acid and

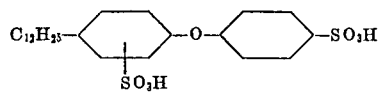

EXAMPLE 11

Equivalent results are obtained when the emulsions are prepared by the following procedure.

A mixture of 96 ml. percent cyclic dimethylsiloxane and 4 mol. percent methyltrimethoxysilane is added to a mixture of 3 percent by weight didodecyl dimethyl ammonium chloride in water in amount to give 40 percent by weight silicone in the emulsion The mixture is then homogenized and NaOH is added in amount to bring the pH into the range of 10.5 to 12. The emulsion is heated at 60° C. for 24 hours and then neutralized with acetic acid.

EXAMPLE 12

A mixture of 37.6 percent by weight cyclic dimethylsiloxanes, 1.00 percent by weight dodecyl benzene sulfonic acid and 53.81 percent by weight water was homogenized at 4500 p.s.i. Then 1 percent more sulfonic acid in 4 g. of water was added and the mixture was heated 2 hours at 85° C., 2.59 percent by weight vinyl trimethoxysilane was then added and the emulsion heated 5 hours at 85° C. The emulsion was then neutralized with 10 percent NaOH diluted to 10 percent silicone, catalyzed with dibutyl tin dilaurate coated on parchment and cured 30 seconds at 200° F.

The release on parchment was 24g. per inch and there was not detectable transfer as shown by applying Scotch Tape to the cured film and checking the adhesion of the tape to itself.

The emulsion contained 3.1 mol. percent $CH_2{=}CHSiO_{3/2}$ and 96.9 mol. percent dimethylsiloxane.

EXAMPLE 13

This example shows the instability of the emulsion of compound 14, example 6, of U.S. Pat. No. 3,360,491.

The compound $(CH_3O)_2Si(CH_3)OSi(CH_3)_{2\ 12}OSiCH_3(OCH)_2$ was emulsion polymerized using lauryl acid sulfate as the catalyst as shown in said patent. The emulsion was neutralized with NaOH, catalyzed with dibutyl tin dilaurate in amount of 1 part slat per 10 parts silicone, coated on parchment and cured 30 seconds at 200° F. The emulsion was then aged at room temperature and the release was checked as shown below.

| Aging time | Release in grams per inch | Subsequent adhesion grams per inch |
|---|---|---|
| 0 | 5 | 165 |
| 1 day | 75 | 68 |
| 2 days | 59 | 48 |
| 1 week | 104 | 30 |

This data shows that the emulsion was not stable in the catalyzed condition as shown by the increase in release and fall-off in subsequent adhesion.

EXAMPLE 14

Equivalent results are obtained when the following silanes are substituted in the procedure of example 1 in amount to give 4 mol. percent $CH_3SiO_{3/2}$ in the copolymer:

$CH_3Si(OOCCH_3)_3$
$CH_3SiCl_3$
$CH_3Si[ON\ C(CH_3)_2]_3$
$CH_3Si(OCH_2CH_2OCH_3)_3$
$CH_3Si(OC_2H_5)_3$
$CH_3Si(OC_6H_5)_3$
$CH_3Si[OCH(CH_3)_2]_3$.

EXAMPLE 15

Equivalent results are obtained when the following silanes are used in procedure of example 11:
$CH_3Si[N(CH_3)_2]_3$
$CH_3Si[ON(CH_3)_2]_3$.

That which is claimed is:

1. A composition capable of curing on a substrate in 30 seconds or less at a temperature of 200° F. or below to give a release value of 50 g. per inch or below when tested on parchment paper by the standard test RC 283 TAPPI, consisting essentially of an aqueous emulsion of a copolymer of 80 to 90 mol. percent dimethylsiloxane and from 2 to 20 mol. percent $RSiO_{3/2}$ in which R is methyl or vinyl, said copolymer containing SiOH groups, said emulsion having been made by emulsion polymerization of a mixture of dimethylsiloxane and $RSiX_3$ in which X is a hydrolyzable group producing a water-soluble byproduct and said emulsion being stable on storage for at least 1 week when catalyzed with a SiOH condensation catalyst effective for curing the copolymer under the above specified conditions.

2. The emulsion of claim 1 in which R is methyl and X is methoxy.

3. The emulsion of claim 1 which contains a SiOH condensation catalyst effective for curing the copolymer under the specified conditions.

4. The emulsion of claim 2 which contains a SiOH condensation catalyst effective for curing the copolymer under the specified conditions.

5. The emulsion of claim 2 in which the catalyst is a carboxylic acid salt of tin.

6. The emulsion of claim 1 in which $RSiO_{3/2}$ is present in amount of 3 to 15 mol. percent.

7. The emulsion of claim 5 in which $CH_3SiO_{3/2}$ is present in amount of 3 to 15 mol. percent.

8. The emulsion of claim 2 in which $CH_3SiO_{3/2}$ is present in amount of 2 to 15 mol. percent.

* * * * *